(12) United States Patent
Cheng

(10) Patent No.: US 7,398,016 B2
(45) Date of Patent: Jul. 8, 2008

(54) BACKLIGHT COMPENSATION USING THRESHOLD DETECTION

(75) Inventor: Brett Anthony Cheng, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 348 days.

(21) Appl. No.: 11/266,883

(22) Filed: Nov. 4, 2005

(65) Prior Publication Data

US 2007/0104475 A1 May 10, 2007

(51) Int. Cl.
G03B 7/08 (2006.01)

(52) U.S. Cl. .................. 396/234; 348/362; 396/222

(58) Field of Classification Search ............... 396/48, 396/50, 89, 130, 213, 233, 234, 348, 157, 396/13
See application file for complete search history.

(56) References Cited

U.S. PATENT DOCUMENTS

| 4,929,824 | A | | 5/1990 | Miyazaki | |
|---|---|---|---|---|---|
| 4,937,611 | A | * | 6/1990 | Miyazaki | 396/234 |
| 5,184,172 | A | | 2/1993 | Miyazaki | |
| 5,664,242 | A | * | 9/1997 | Takagi | 396/234 |
| 5,678,098 | A | | 10/1997 | Ishihara et al. | |
| 5,774,747 | A | | 6/1998 | Ishihara et al. | |
| 6,275,659 | B1 | | 8/2001 | Ishihara et al. | |
| 6,389,232 | B2 | | 5/2002 | Ishihara et al. | |
| 6,424,805 | B2 | * | 7/2002 | Ohsawa | 396/50 |
| 6,496,651 | B2 | | 12/2002 | Ishihara et al. | |
| 7,102,682 | B2 | * | 9/2006 | Baer | 348/364 |
| 2002/0006283 | A1 | | 1/2002 | Mori et al. | |
| 2005/0041136 | A1 | * | 2/2005 | Miyata et al. | 348/345 |
| 2005/0083428 | A1 | | 4/2005 | Ohkawara | |
| 2007/0071344 | A1 | * | 3/2007 | Ouzilevski et al. | 382/254 |

FOREIGN PATENT DOCUMENTS

JP 5-313224 11/1993

\* cited by examiner

*Primary Examiner*—Marvin Lateef
*Assistant Examiner*—Minh Phan
(74) *Attorney, Agent, or Firm*—Mark P. Watson

(57) ABSTRACT

A method and circuit for excluding regions from an exposure calculation is described. The method includes obtaining pre-image data representing an image of a scene and dividing the image into a plurality of regions. Regions that contain a predetermined number of bright pixels are identified, bright pixels being pixels that are brighter than a threshold level of brightness. Each region that has at least the predetermined number of bright pixels from the exposure calculation are excluded.

20 Claims, 4 Drawing Sheets

BACKLIGHT COMPENSATION USING THRESHOLD DETECTION

BACKGROUND

It is a common experience among photographers that a subject of a scene is much darker than the background. For example, in outdoor photography, a subject may be situated against a bright sky, beach, or snow. In indoor photography, the subject may be situated in a relatively dark room having bright windows, ceiling lights, or other bright objects. For scenes having these characteristics, the photographer may manually adjust exposure settings so that the subject of the image is brightly lit, allowing bright background areas to become over-exposed. These exposure settings generally include shutter speed and aperture (f-stop) setting. For film-based cameras, the appropriate exposure settings will vary with the film speed. For digital cameras, the exposure setting can also include a sensitivity (ISO) value, sometimes referred to as gain. The appropriate shutter speed and aperture setting also has implications for depth-of-field. The challenge of correctly identifying optimum exposure settings for a particular scene is daunting to many photographers, novice and professional alike.

In an attempt to simplify exposure settings for novice photographers, many cameras have various automatic exposure settings which cause the camera to select an appropriate shutter speed for a particular aperture, an appropriate aperture for a particular shutter speed, or fully automatic exposure in which the camera selects an appropriate shutter speed and aperture. To achieve any automatic exposure setting, however, the camera must have some way of detecting the brightness of the image prior to taking the picture so that the exposure is adjusted appropriately for the scene.

Camera manufacturers have developed many mechanisms for automatically selecting exposure settings for particular scenes. In traditional film-based photography, the simplest auto-exposure cameras have a light meter that reads an overall amount of light in the scene as whole, and adjusts the exposure setting according to the level of light. Unfortunately, where the image contains an excessive amount of light in the background of a scene, the automatic exposure setting will result in the subject being too darkly lit, and may appear in shadow or even silhouetted in extreme cases. To reduce the effects of backlighting, some film-based cameras identify brightness levels at different regions of an image and give greater weight to the brightness at the center of the image. The result of these systems varies depending on whether the subject is centrally located when the picture is taken. In another approach, "spot metering" is performed at a central portion of the image frame. The photographer is required to align the subject with the central spot, store the exposure details for the subject, compose the picture, possibly arranging the subject off to one side, and finally take the picture. While this process generally results in a properly balanced image, it significantly increases the complexity beyond the simple "point and shoot" operation that many photographers demand.

In digital photography, it is common for a camera to determine exposure settings by utilizing the image sensor itself either during the exposure period or immediately before the exposure period. Such information may be referred to as "pre-image data" and may be used to estimate appropriate automatic exposure settings. Prior art cameras employ various algorithms using pre-image data to calculate an optimum exposure estimate. For example, the image area may be divided into a number of segments, with the average luminance calculated or estimated for each segment, with centrally-positioned segments being weighted more than peripheral segments. In this way, these advanced digital cameras mimic the functionality of existing film-based cameras. However, the algorithms used to determine an optimum exposure estimate can be complex, requiring a number of averages to be calculated, which is burdensome for small hand-held cameras or low-power devices such as cell phones that incorporate imaging functionality and have limited processing power.

Therefore, there is an unmet need for a simplified optimum exposure estimating device or method to compensate for bright background regions of a scene.

SUMMARY

Broadly speaking, the present invention fills these needs by providing a method and device having backlight compensation using simplified threshold detection.

It should be appreciated that the present invention can be implemented in numerous ways, including as a process, an apparatus, a system, a device, or a method. Several inventive embodiments of the present invention are described below.

In one embodiment, a method for excluding regions from an exposure calculation is provided. The method includes obtaining pre-image data representing an image of a scene and dividing the image into a plurality of regions. Regions that contain a predetermined number of bright pixels are identified, bright pixels being pixels that are brighter than a threshold level of brightness. Each region that has at least the predetermined number of bright pixels are excluded from the exposure calculation.

In another embodiment, a method for excluding from an exposure calculation a region above an estimated horizon line is provided. The method includes receiving pre-image data representing a scene. The number of bright pixels in each row of the pre-image data is determined, each bright pixel being a pixel having a brightness greater than a threshold level of brightness. An estimated horizon line is identified by analyzing the number of bright pixels in each row. The region above the estimated horizon line is excluded from an exposure calculation.

In yet another embodiment, an exposure circuit for calculating an exposure setting when imaging a scene is provided. The exposure circuit includes logic for receiving pre-image data representing the scene. Further logic divides the pre-image data into a plurality of regions. Further logic excludes from an exposure calculation one or more regions based on a comparison of pixel brightness to a threshold level of brightness, and performs detailed exposure calculation using remaining regions.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 4b shows a histogram showing a number of bright pixels per row in the scene shown in FIG. 4a.

DETAILED DESCRIPTION

Figure 1:
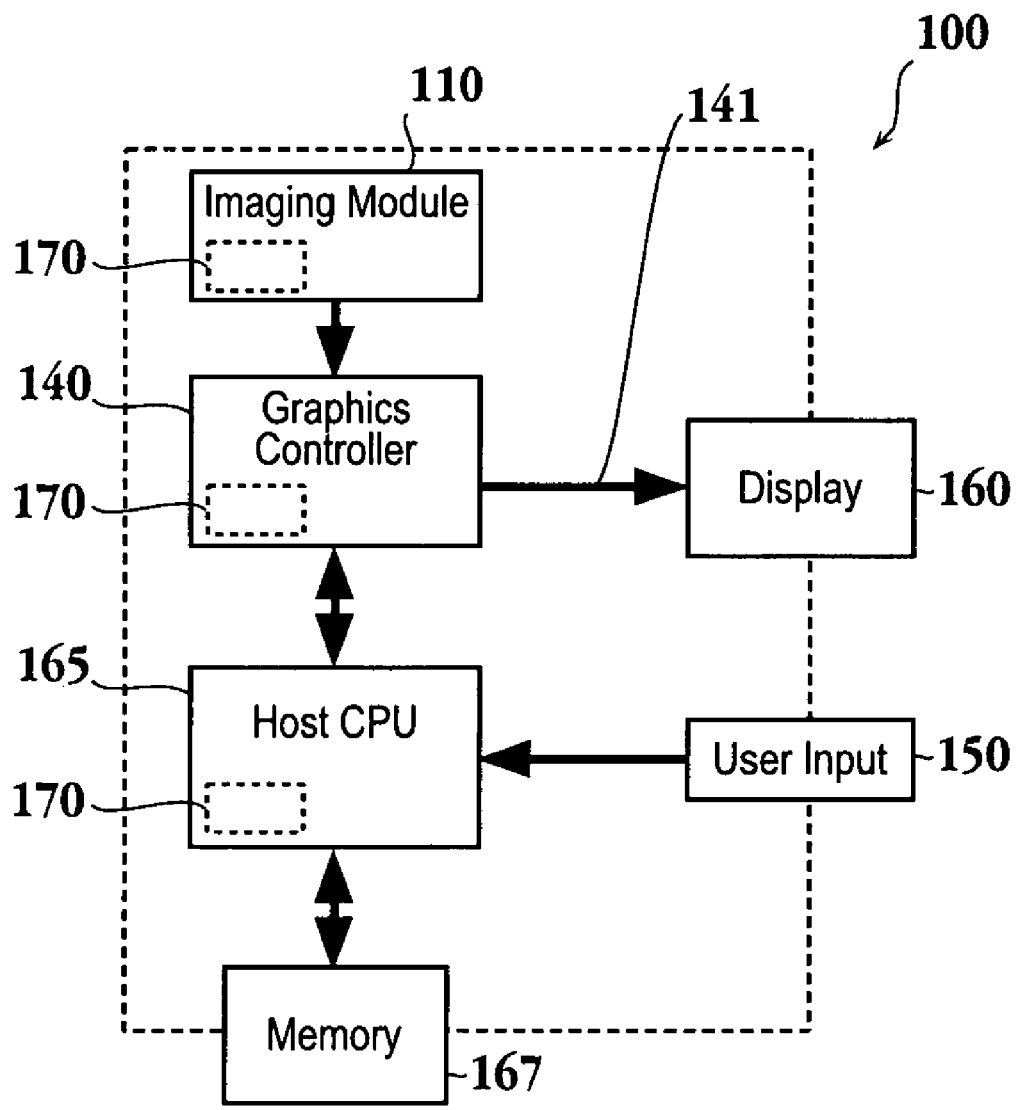
FIG. 1 shows a schematic diagram of an imaging device.

FIG. 1 is a schematic overview of an imaging device 100. Imaging device 100 may be a digital camera, digital video recorder, or some electronic device incorporating a image capture or video recorder functionality, such as, for example, a personal digital assistant (PDA), cell phone or other communications device. Imaging device 100 includes an imaging module 110, a graphics controller 140, a host central processing unit (CPU) 165, and a display 160.

The timing control signals and data lines, such as line 141 communicating between graphics controller 140 and display 160, are shown as a single line but may in fact be several address, data, and control lines and/or a bus. All communication lines shown in the figures will be presented in this manner except as noted to reduce the complexity and better present various novel aspects of imaging device 100.

Imaging module 110 includes an image sensor positioned adjacent a lens (not shown) such that light is focused on and forms an image on the sensor, and circuitry for reading out image data from the image sensor to graphics controller 140. The image sensor may be a charge-coupled device (CCD) or complementary metal-oxide semiconductor (CMOS) type image sensor that converts light into electronic signals that represent the level of light at each pixel. Other image sensors that are known or may become known that are capable of converting an image formed by light into electronic signals representative of the image may also be used. Imaging module 110 then converts these electronic signals into image data, which is passed to graphics controller 140. Imaging module 110 may have varying resolutions depending upon the application. In one embodiment, the image sensor comprises a two-dimensional array of pixel sensors in which each pixel sensor has a color filter in front of it in what is known as a color filter array (CFA). One common type of CFA is the Bayer filter in which every other pixel has a green filter over it in a checkerboard pattern, with remaining pixels in alternate rows having blue and red filters. Other types of color image sensors are available or may become available that are suitable for use with imaging device 100. In addition, the present invention may also be used with a gray-scale image sensor used for taking black and white (gray-scale) photographs.

Graphics controller 140 receives image data from imaging module 110, and, in accordance with instructions from host CPU 165, can send the image data to display 160 or host CPU 165. Graphics controller 140 may include image processing capabilities such as image compression technology for converting image data received from imaging module 110 into compressed image data, such as, for example, a Joint Photographic Exert Group (JPEG) format. Imaging module or graphics controller 140 can include an integrated circuit 170 for calculating an exposure setting as discussed below with reference to FIGS. 3 and 5.

Display 160 can be any form of display capable of displaying an image. In one embodiment, display 160 comprises a liquid crystal display (LCD). However, other types of displays are available or may become available that are capable of displaying an image that may be used in conjunction with imaging device 100. Although imaging module 110 and display 160 are presented as being part of imaging device 100, it is possible that one or both of imaging module 110 and display 160 are external to or even remote from each other and/or graphics controller 140. For example, if imaging device 100 can be used as a security camera or baby monitor, it may be desirable to provide a display 160 that is separable from or remote to the imaging module 110 to provide monitoring capability at a remote location. In another embodiment, e.g., for a compact camera, display 160 is not provided. In this case, the photographer may rely on an optical view finder (not shown) or other means for aligning the image sensor with the intended subject.

Host CPU 165 performs digital processing operations and communicates with graphics controller 140. In one embodiment, host CPU 165 comprises an integrated circuit 170 capable of executing firmware retrieved from memory 167. This firmware provides imaging device 100 with functionality when executed on host CPU 165. Host CPU may also be a digital signal processor (DSP) or other processing device.

Memory 167 may be internal or external random-access memory or non-volatile memory. Memory 167 may be non-removable memory such as flash memory or other EEPROM, or magnetic media. Alternatively, memory 167 may take the form of a removable memory card such as ones widely available and sold under such trademarks as "SD RAM," "COMPACT FLASH," and "MEMORY STICK." Memory 167 may also be any other type of machine-readable removable or non-removable media. Memory 167 may be remote from imaging device 100. For example, memory may be connected to imaging device 100 via a communications port (not shown). For example, imaging device 100 may include a BLUETOOTH® interface or an IEEE 802.11 interface, commonly referred to as "Wi-Fi." Such an interface may connect imaging device 100 with a host (not shown) for uploading image data to the host. If imaging device 100 is a communications device such as a cell phone, it may include a wireless communications link to a carrier, which may then store data in hard drives as a service to customers, or transmit image data to another cell phone or email address. Memory 167 may be a combination of memories. For example, memory 167 may include a removable memory card for storing image data, and a non-removable memory for storing data and firmware executed by host CPU 165.

Host CPU 165 is also in communication with user input device 150. In one embodiment, user input device 150 comprises a shutter button. Alternatively, user input device 150 may comprise any number of alternate means, such as a keypad, a remote control, touch-screen, sound or voice activation, etc. User input device 150 may further include a mode selection dial or graphical interface buttons for selecting items listed on display 160. In response to certain user input, user input device 150 sends a signal to host CPU 165 causing data representing an image to be sent to memory.

In operation, a photographer may save a single image by orienting imaging device 100 such that a desired image is aligned with the image sensor of imaging module 110. Graphics controller 140 then passes resulting image data to either or both of display 160 and host CPU 165 for storage in memory. Imaging module 110 and/or graphics controller 140 may include image processing circuitry for compressing the image using an image compression algorithm such as the well known JPEG image format. In one mode of operation, display 160 is continuously updated with an image most recently received by imaging module 110. When the user desires to send data representing a current image to memory 167, the user will interact with user input device 150 causing an image received by imaging module 110 to be passed to a frame buffer in graphics controller 140, from which host CPU 165 will access and store the image in memory 167. Instead of or in addition to taking single still images, imaging device 100 may be capable of generating a video stream. In this case, graphics controller 140 may receive an image periodically, e.g., 30 times a second, which is then encoded using Moving Picture Experts Group (MPEG) or other encoding technology and stored in memory 167.

For still images, pre-image data is retrieved from imaging module 110 immediately prior to or during an exposure period for an image to be stored. For video recording, pre-image data may be obtained from a previous captured frame of the video stream. Pre-image data is data from imaging module 110 used to calculate, according to a given algorithm, exposure settings for imaging device 100. Exposure settings may include shutter speed, aperture, and sensitivity, sometimes referred to as gain. In some instances, the shutter may remain open when generating a video stream, in which case shutter speed is not a factor. Pre-image data may also be used to identify a focus setting. Pre-image data may comprise data representative of a full-resolution image, or some reduced resolution image. Pre-image data may comprise simply a brightness amount generated from pixels sensitive one or more of green, red, or blue light, e.g., pixels positioned behind just the green filters of a CFA.

Figure 2:
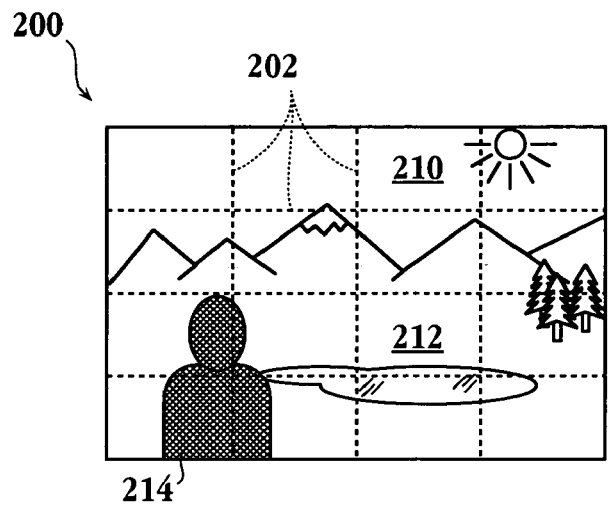
FIG. 2 shows an exemplary scene divided into a plurality of regions.

FIG. 2 shows an exemplary scene divided into a number of regions by dashed lines 202. Some regions contain the subject 214, others contain only background portions, which may generally be identified as any area that is not the subject. The background may be divided into bright sky 210 and ground 212. It is possible to determine optimum exposure settings based on regions of a scene 200 that do not form part of the bright sky 210. In one embodiment, regions having a number of pixels over a predetermined threshold number of pixels that are brighter than a threshold brightness are assumed to include background sky 210, and are therefore not included in subsequent exposure calculations. The total number of regions may vary according to implementation, and may be as high as 40 regions or more. The regions may be square or rectangular, and may be of uniform size or have varying sizes. Furthermore, the regions may be asymmetrically distributed.

Figure 3:
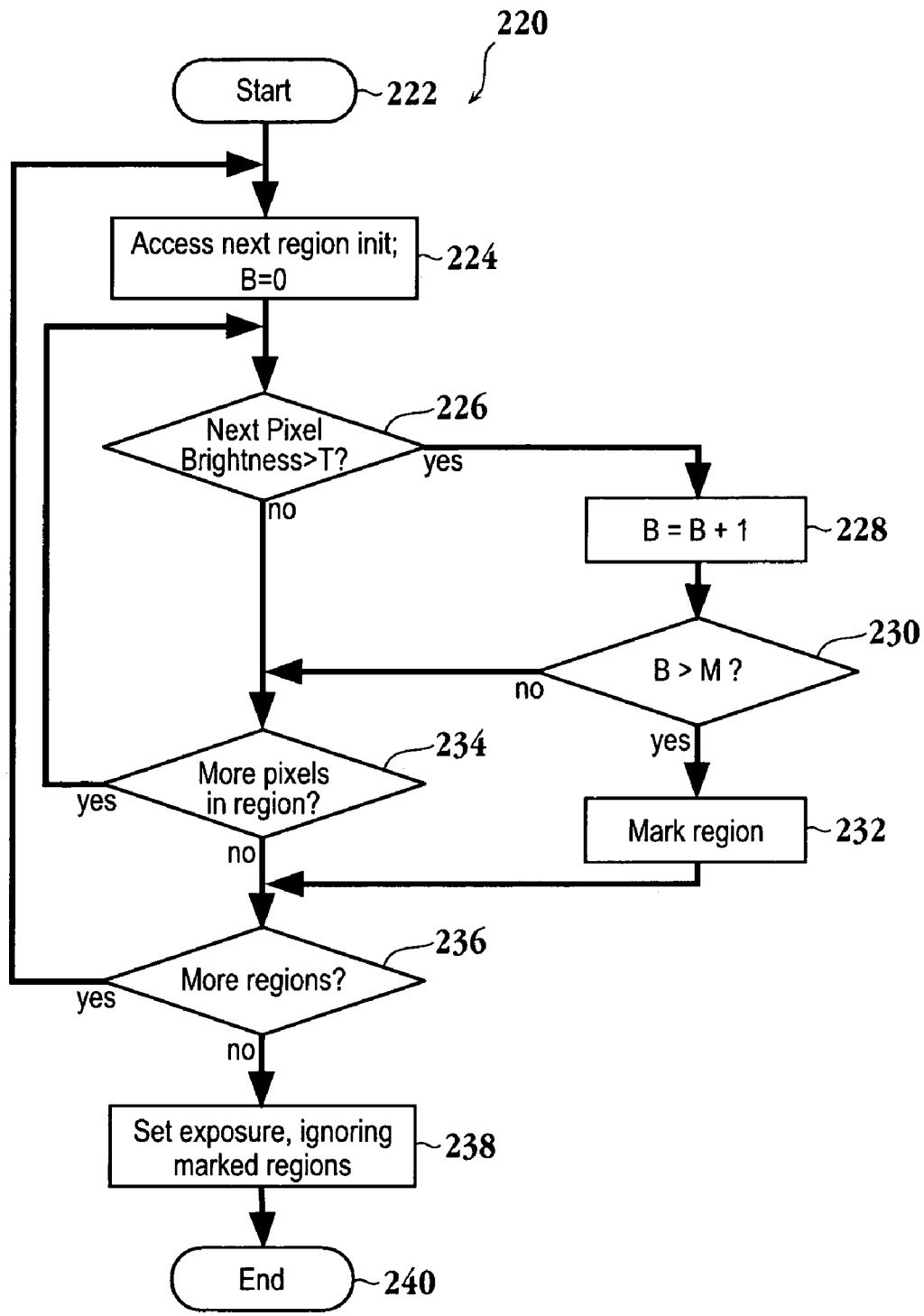
FIG. 3 is a flowchart illustrating an exemplary procedure for eliminating bright regions of a scene when determining exposure settings

FIG. 3 shows a flowchart 220 depicting an exemplary procedure for identifying bright background regions in an outdoor image from pre-image data. The pre-image data is divided into a number of regions, with the procedure looking at each region individually. Although the flowchart provides a linear view of the processing of pre-image data, the processing may proceed in parallel, with more than one pixel or region accessed at a time. The procedure may be implemented in hardware using integrated circuit 170 in imaging module 110 or graphics controller 140 or in software, wherein the integrated circuit comprises 170 processing logic in host CPU 165 (FIG. 1). Integrated circuit 170 may comprise various logic gates in accordance with known circuitry design principles. The integrated circuit comprises various logic elements for carrying out the procedure of FIG. 3.

The procedure begins as indicated by start block 222 and flows to operation 224 wherein a next region is accessed and the value B is initialized to zero. If new pre-image data is being processed, then the next region will be the first region. The order in which regions are accessed does not affect the result of the procedure. After the next region is accessed, the procedure flows to operation 226 wherein a next pixel brightness is compared with a threshold value T. If the region has not yet been processed, the "next pixel" can be the first pixel in the region. If the pixel brightness is less than T, then the procedure flows to operation 234. If the pixel brightness is greater than (or equal) to T, then the procedure flows to operation 228.

In operation 228, a value B is incremented. Thus, the value B provides a count of the number of bright pixels in the region, i.e., pixels having a brightness greater than T for the current region. After B is incremented, the procedure flows to operation 230 where the value B is compared with the threshold value M. The threshold value M may be a constant if each region has the same number of pixels. If the regions vary, than M may be defined separately for each region. M may also be defined differently from one region to the next to provide a weighting factor to certain regions. For example, M may be lower in regions close to the top of the image, and higher for regions closer to the bottom or center of the image. Alternatively, M may be calculated as a percentage of the number of pixels in the current region. In one example, M may be 20% of the number of pixels in the region. If B is less than M, then the procedure flows to operation 234. If B is greater than M, then the current region is considered to be a bright background region, and not the subject of the outdoor scene. The region therefore does not need any further processing and the procedure flows to operation 232 wherein the region is marked. Finally, the processing flows to operation 236 to determine whether or not there are any more regions.

If, in operation 226, it is determined that the next pixel brightness is less than T or if, in operation 230, it is determined that the value B is less than the threshold value M, then the procedure flows to operation 234 wherein it is determined whether or not there are more pixels in the region. If there are more pixels in the region, then the procedure returns to operation 226 to compare the next pixel brightness with the threshold value T. If, in operation 234 it is determined that there no more pixels in the region, then the procedure flows to operation 236.

In operation 236 it is determined whether there are any more regions. If there are more regions, then the procedure flows to operation 224 to access the next region. If there are no more regions, then the procedure flows to operation 238.

In operation 238, the pre-image data, with the exception of regions marked in operation 232, is analyzed to determine appropriate exposure settings for capturing a properly balanced image of the scene. After the exposure settings are determined, the procedure ends as indicated by end block 240.

It should be noted that, while particularly suited to compensating for bright background elements in outdoor scenes, the above mentioned procedure can also be implemented in indoor scenes as well. In the case of indoor scenes, the brightness threshold value T may be reduced from the value used for outdoor scenes so that if a region contains a number of pixels brighter than expected for indoor photography, such as a window, light fixture, etc., it can be excluded from the exposure calculation. It is envisioned that the photographer will select an operation mode for imaging device 100 consistent with the type of picture he or she intends to take, e.g., indoor or outdoor photographs.

Figure 4A:
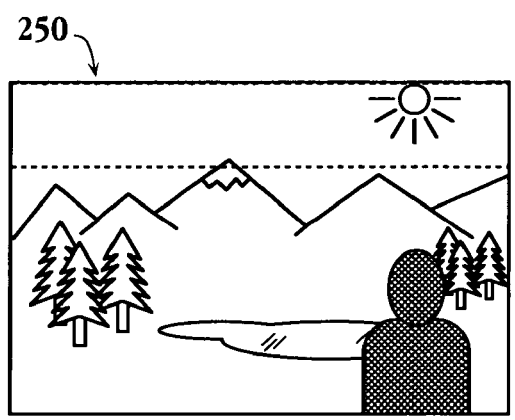
FIG. 4a shows an exemplary scene illustrating horizon detection.
Figure 4B:
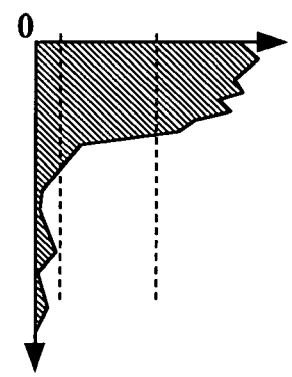

In another embodiment specific to outdoor photography, a horizon location is estimated based on a number of pixels in each line having a brightness greater than a threshold value, then the region above the horizon is excluded from subsequent exposure calculations. To illustrate, FIG. 4a shows an exemplary typical outdoor scene comprising hills, trees, and the sun, with a subject person in the foreground. The image is formed from pre-image data and contains a number of rows of pixels. The brightness of each pixel of each row is compared with a threshold value. FIG. 4b shows a histogram showing for each row, the number of pixels having a brightness exceeding the threshold value. By examining the histogram, an estimated location of a horizon, i.e., a dividing line between sky and ground can be determined. Then detailed exposure calculations can be made based on the region below that dividing line. The horizon estimation and/or detailed exposure calculations may be implemented in hardware using an integrated circuit 170 in imaging module 110 or graphics controller 140 or in software using integrated circuit 170 in host CPU 165 (FIG. 1).

Figure 5:
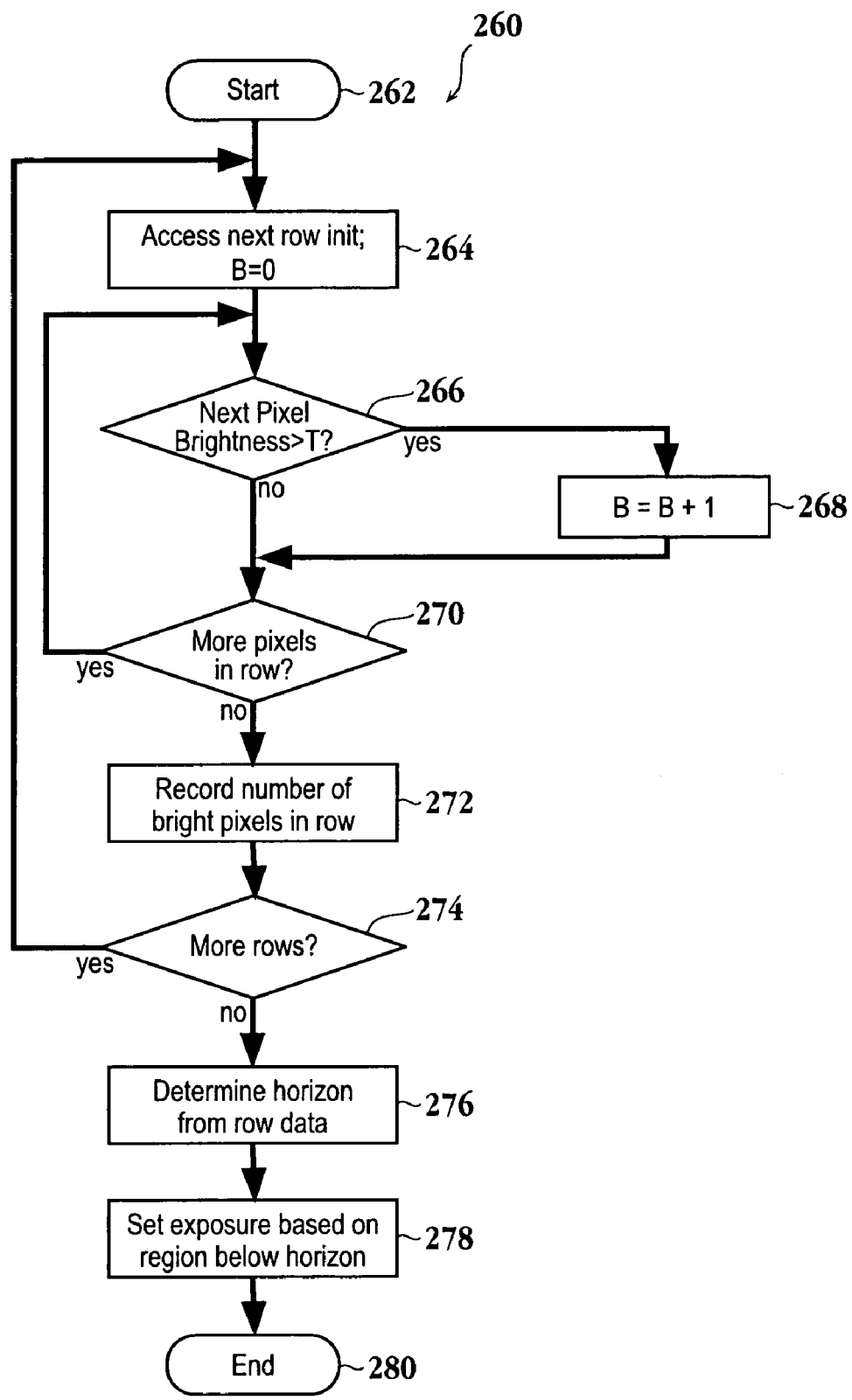
FIG. 5 is a flowchart illustrating an exemplary procedure for eliminating a region above an estimated horizon from an exposure calculation.

FIG. 5 shows a flowchart 260 providing an exemplary procedure for performing this analysis. The procedure begins as indicated by starting block 262 and proceeds to operation 264 wherein a next row is accessed and the value B is initialized to zero. If no rows have yet been accessed, then the "next row" will be the first row. The rows extend horizontally across the image and may be one or more pixels in height. After accessing the next row and initializing B to zero, the procedure flows to operation 266.

In operation 266 a next pixel is accessed in the current row, and the brightness of the pixel is compared with a threshold brightness value T. The threshold brightness is selected to be a value above which can be assumed to be a bright sky. If the pixel is brighter than the threshold value T, then the procedure flows to operation 268 wherein the value B is incremented. Thus, the value B provides a count of the number of pixels in the current row having a brightness greater than the threshold value. If, in operation 266, the pixel is less than T, the procedure flows to operation 270.

In operation 270, it is determined whether there are more pixels in the current row. If there are more pixels, then the procedure returns to operation 266 to access the next pixel. If there are no more pixels, then the procedure flows to operation 272.

In operation 272, the number of bright pixels in the current row is recorded. It is possible to skip this step if B is an array indexed by a row number, so that $B_x$ would be number of bright pixels for row X. After operation 272 wherein the number of bright pixels in the current row is recorded, the procedure flows to operation 274.

In operation 274, it is determined whether or not there are more rows. If there are more rows, then the procedure returns to operation 264 to access the next row. However, if there are no more rows, then the procedure flows to operation 276.

In operation 276, a location of a horizon is determined. There are different possible approaches to determining the location of the horizon based on the bright pixel counts. In one example, the first row, starting at the top, having fewer than a predetermined number, e.g., 20%, of bright pixels is assumed to be the horizon. It is possible that, because of the circumstances of the current scene, that no horizon can be calculated. For example, if the scene is of a dark cloudy day, or if the scene includes bright foreground elements such as a sandy beach or snow, then no horizon may be identifiable. In such cases this algorithm will be able to determine that there is no identifiable horizon, which is also useful information. After determining the location of the horizon (or absence thereof), the procedure flows to operation 278.

In operation 278, the exposure settings are calculated using known algorithms wherein the settings are determined based on the region below the estimated horizon. After calculating the exposure settings, the procedure ends as indicated by end block 280.

Thus, various regions of a scene can be excluded from exposure calculations without using time consuming calculations such as traditional algorithms relying on weighted averages etc. As a result, the methods described above provide accurate estimation of bright background regions to provide reliable point-and-shoot picture taking in low powered, inexpensive imaging-devices.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also include an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared-among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for excluding regions from an exposure calculation, the method comprising operations of:
obtaining pre-image data representing an image of a scene;
dividing the image into a plurality of regions, wherein the plurality of regions include portions of multiple rows of the scene;
determining if each of the regions contains a predetermined number of bright pixels, bright pixels being pixels that are brighter than a threshold level of brightness; and excluding each region and corresponding portions of multiple rows of the scene that has at least the predetermined number of bright pixels from the exposure calculation.

2. The method of claim 1, wherein the predetermined number of bright pixels for the excluding is defined differently for at least two of the regions and wherein each pixel value is compared to the corresponding predetermined number.

3. The method of claim 1, wherein, for each region, the predetermined number of bright pixels is a fixed percentage of a number of pixels in said each region.

4. The method of claim 1, further comprising a method operation of:
receiving a mode selection prior to obtaining the pre-image data, the threshold level of brightness being determined based on the mode selection.

5. The method of claim 1, wherein the method operation of determining comprises:
comparing each pixel to the threshold level of brightness;
incrementing a counter when the pixel exceeds the threshold level of brightness;
marking the region as a bright region and stopping the comparing when the counter reaches the predetermined number of bright pixels.

6. The method of claim 1, wherein the method operation of determining is carried out in hardware using an exposure circuit in one of an imaging module or a graphics controller, or in software using a host CPU in an imaging device.

7. The method of claim 1 wherein the method operations are embodied as program instructions on a computer readable medium.

8. A method for excluding from an exposure calculation a region above an estimated horizon line, the method comprising method operations of:
receiving pre-image data representing a scene;
determining a number of bright pixels in each row of the pre-image data, each bright pixel being a pixel having a brightness greater than a threshold level of brightness;
identifying the estimated horizon line by analyzing the number of bright pixels in each row; and
excluding a region above the estimated horizon line from an exposure calculation.

9. The method of claim 8, wherein the method operation of determining comprises, for each row, comparing each of the pixels to the threshold level of brightness and incrementing a counter when the pixel has a brightness greater than the threshold level of brightness.

10. The method of claim 8, wherein the method operation of identifying comprises finding a highest row having a number of bright pixels lower than a predetermined number of bright pixels wherein the highest row is closest to a top of the scene as represented by the pre-image data.

11. The method of claim 10, further comprising a method operation of:
receiving a mode selection prior to obtaining the pre-image data, the threshold level of brightness being determined based on the mode selection.

12. The method of claim 8, wherein the method operation of determining is carried out in hardware using an exposure circuit in one of an imaging module or graphics controller or in software using a host CPU in an imaging device.

13. The method of claim 8 wherein the method operations are embodied as program instructions on a computer readable medium.

14. An integrated circuit for calculating an exposure setting when imaging a scene, the integrated circuit comprising:
logic for receiving pre-image data representing the scene;
logic for dividing the pre-image data into a plurality of regions;
logic for excluding from an exposure calculation one or more of the plurality of regions based on a comparison of pixel brightness to a threshold level of brightness, wherein each region comprises a row pixels, the logic for excluding comprising logic for determining a number of bright pixels in each of the rows, each bright pixel being a pixel having a brightness greater than the threshold level of brightness, logic for identifying the estimated horizon line by analyzing the number of bright pixels in each row, and wherein the excluded region is a region above the estimated horizon line; and
logic for performing the exposure calculation using a remaining region of the pre-image data.

15. The integrated circuit of claim 14, wherein the logic for excluding comprises logic for determining if each of the regions contains a predetermined number of bright pixels, bright pixels being pixels that are brighter than the threshold level of brightness, wherein excluded regions are ones of the regions that have at least the predetermined number of bright pixels.

16. The integrated circuit of claim 15, wherein the logic for determining comprises logic for comparing each pixel to the threshold level of brightness, logic for incrementing a counter when the pixel exceeds the threshold level of brightness, and logic for marking the region as a bright region and stopping the comparing when the counter reaches the predetermined number of bright pixels.

17. The integrated circuit of claim 14, wherein the threshold level of brightness is different for at least two of the plurality of regions.

18. The integrated circuit of claim 17, wherein the logic for determining comprises, logic that, for each row, compares each of the pixels to a threshold level of brightness and increments a counter when the pixel has a brightness greater than the threshold level of brightness.

19. The integrated circuit of claim 17, wherein the logic for identifying comprises logic for finding a highest row having a number of bright pixels lower than a predetermined number of bright pixels.

20. The integrated circuit of claim 14 wherein the integrated circuit is integrated into an image capture device.

* * * * *